Patented Aug. 12, 1930

1,772,511

UNITED STATES PATENT OFFICE

ALBERT HARTZELL AND FRANK HEIDTMAN LATHROP, OF GENEVA, NEW YORK, ASSIGNORS TO WALTER C. O'KANE, OF DURHAM, NEW HAMPSHIRE, AND PAUL MOORE, OF WASHINGTON, DISTRICT OF COLUMBIA, TRUSTEES OF CROP PROTECTION INSTITUTE

SULPHUR EMULSION AND INSECTICIDE CONTAINING THE SAME

No Drawing.   Application filed January 2, 1924. Serial No. 684,060.

This invention relates to sulphur emulsions and more particularly to such sulphur emulsions usable as insecticides.

One of the objects of this invention is to produce a sulphur emulsion that shall be miscible with water within wide limits.

A further object of this invention is to produce an economical insecticide which shall reduce the costs of spraying.

Other and further objects and advantages of this invention will appear from the more detailed description set forth below, it being understood that various changes may be made therein by those skilled in these arts without departing from the spirit or scope of this invention.

Fundamentally, this invention comprises the production of a sulphur emulsion, preferably in the form of a stock solution which may be used in various dilutions with water, or may be mixed with other substances to give valuable insecticidal compositions. This stock solution is preferably composed of an emulsified sulphur mixture. Various emulsifying agents may be used for this purpose.

As indicating the preferred method of carrying out this invention, the following example is given:

*I (a)*

250 c. c. carbon disulfide, 1 or more grams flowers of sulphur, up to point of saturation

*I (b)*

200 c. c. water, 5 grams of fish oil soap.

A solution of the sulphur in carbon disulfide is obtained for example by agitating the flowers of sulphur with carbon disulfide. The latter is preferably the commercial grade, but may be that of first or second distillation. After standing preferably for about 24 hours, the solute is desirably siphoned from the insoluble sulphur that collects at the bottom of the container. An emulsifying agent is then prepared, say, for example, fish oil soap in water as follows: 5 grams of fish oil soap in 200 c. c. of water are agitated as by a soda fountain mixer until the soap is thoroughly emulsified. This takes about five minutes. The sulphur solution is then added slowly until a creamy emulsion is formed, and the mixture is again agitated for about five minutes. This results in a stock solution that may be diluted with water to the desired strength, up to for example 1:10000 parts. For example, in the formula given above in dilutions of 1:40 the mixture has given good results as a contact spray for such insects as apple aphids, pear psylla, and red mite.

While a specific example of the best mode of preparing this stock solution has been given, it is to be understood that this invention is not limited to the stated manipulative details or components and proportions.

The flowers of sulphur may be replaced by any of the crystalline sulphurs soluble in carbon disulfide, or may in fact be omitted completely, although in the latter case they have been found to be less efficient. In place of fish oil soap, various emulsifiers may be used as for example: glue, gelatine, calcium caseinate, sodium caseinate, resin (dissolved preferably in alcohol), gum arabic (dissolved preferably in alcohol), a miscible oil, or a sodium or potassium soap. The amount of sulphur may vary widely, for example: ½ gram to 25 grams per 250 c. c. of carbon disulfide. Similarly, the amount of emulsifier, for example, soap, may vary from ½ gram to 15 grams per 200 c. c. water. These are not intended to be limiting proportions other than for obtaining better results.

There is further given below a series of other emulsions that have been prepared.

*II*

50 c. c. of carbon disulfide
1 gram of crystalline sulphur
1 gram of gum arabic or resin (dissolved in alcohol)
200 c. c. of water

*III*

50 c. c. carbon disulfide
1 gram of crystalline sulphur
1 gram of gelatine
200 c. c. water preferably hot

IV 100 c. c. of carbon disulfide
1 gram of crystalline sulphur
5 grams of sodium or calcium caseinate
200 c. c. of water

V 150 c. c. of carbon disulfide
1 gram of crystalline sulphur
2.5 grams of glue
200 c. c. of water

VI 40 c. c. of carbon disulfide
1 gram of crystalline sulphur
40 c. c. of miscible oil
40 c. c. of water
5 grams of soap These stock emulsions are prepared preferably in accordance with the method given above.

Furthermore, these stock emulsions may be used not only alone in desired dilutions, but they may be mixed with other ingredients. The following mixtures have been found of value:

200–250 c. c. carbon disulfide
1– 5 grams of flowers of sulphur
150–200 c. c. of water
1– 10 grams of fish oil soap to which may be added 10– 15 c. c. oleic acid
100–200 c. c. of water Ammonium or nicotine oleate may be used in place of oleic acid.

The following specific insecticide has proved very valuable on pear psylla, used in concentrations such as one part in one hundred parts of water:

12 c. c. oleic acid
20 c. c. free nicotine solution
200 c. c. water
100 c. c. of Emulsion I The nicotine and oleic acid are added and dissolved in 200 c. c. of water. This solution is then agitated and the carbon disulfide-sulphur emulsion added.

It will thus be seen that this invention is of considerable breadth and gives insecticides that will materially reduce the cost of spraying. For example in the last mixture given the amount of nicotine per gallon of spray is reduced to approximately half of that usually required.

Having thus set forth our invention, we claim:

1. A sulphur emulsion comprising carbon disulfide, sulphur, an emulsifier, and water.

2. A sulphur emulsion comprising carbon disulfide, sulphur, fish oil soap, and water.

3. A sulphur emulsion containing carbon disulphide and sulphur and miscible with water.

4. An insecticide comprising carbon disulfide, sulphur in amount less than that required to saturate the carbon disulfide, an emulsifier, and water.

5. An insecticide comprising carbon disulfide, sulphur, an emulsifier, oleic acid and water.

6. An insecticide comprising carbon disulfide, sulphur, fish oil soap, oleic acid, and water.

7. An insecticide comprising carbon disulfide, sulphur, fish oil soap, oleic acid, nicotine sulfate and water.

8. The method of making sulphur emulsions which comprises dissolving sulphur in carbon disulfide, mixing an emulsifier with water, and then adding the sulphur solution to the emulsifier water mixture.

ALBERT HARTZELL.
FRANK HEIDTMAN LATHROP.